United States Patent
Brion et al.

(10) Patent No.: US 12,347,115 B2
(45) Date of Patent: Jul. 1, 2025

(54) METHOD AND SYSTEM FOR SKELETONIZING STRANDS OF A COMPOSITE MATERIAL PART IN A 3D IMAGE

(71) Applicant: SAFRAN, Paris (FR)

(72) Inventors: Véronique Brion, Moissy-Cramayel (FR); Nacim Belkhir, Moissy-Cramayel (FR); Jorge Eduardo Hernandez Londono, Moissy-Cramayel (FR); Roger Fernando Trullo Ramirez, Moissy-Cramayel (FR)

(73) Assignee: SAFRAN, Paris (FR)

(*) Notice: Subject to any disclaimer, the term of this patent is extended or adjusted under 35 U.S.C. 154(b) by 485 days.

(21) Appl. No.: 17/907,351

(22) PCT Filed: Mar. 15, 2021

(86) PCT No.: PCT/EP2021/056463
§ 371 (c)(1),
(2) Date: Sep. 26, 2022

(87) PCT Pub. No.: WO2021/197813
PCT Pub. Date: Oct. 7, 2021

(65) Prior Publication Data
US 2023/0113698 A1    Apr. 13, 2023

(30) Foreign Application Priority Data
Mar. 28, 2020   (FR) ........................... 2003093

(51) Int. Cl.
*G06T 7/181*    (2017.01)
*G06T 15/08*    (2011.01)
*G06V 10/74*    (2022.01)

(52) U.S. Cl.
CPC .............. *G06T 7/181* (2017.01); *G06T 15/08* (2013.01); *G06V 10/761* (2022.01);
(Continued)

(58) Field of Classification Search
CPC ..................... G06T 7/181; G06T 15/08; G06T 2207/10081; G06T 2207/20044;
(Continued)

(56) References Cited

U.S. PATENT DOCUMENTS

2009/0279743 A1* 11/2009 Li ........................ G01N 15/1433
                                                    382/111
2017/0004613 A1*  1/2017 Morard .................. G06T 15/08
2018/0276887 A1*  9/2018 Younas .................... G06T 7/12

FOREIGN PATENT DOCUMENTS

FR          3050274 A1    10/2017

OTHER PUBLICATIONS

"Michael Czabaj, Numerical reconstruction of graphite/epoxy composite microstructure based on sub-micron resolution X-ray computed tomography, 2014, Composite Science and Technology Journal, pp. 174-182" (Year: 2014).*
"Peter Creveling, A fiber-segmentation algorithm for composites imaged using X-ray microtomography: Development and validation 2019, Composite Science and Technology Journal, pp. 1-13" (Year: 2019).*

(Continued)

*Primary Examiner* — Andrew W Bee
*Assistant Examiner* — D J Dhooge
(74) *Attorney, Agent, or Firm* — Alumen IP Law PC

(57) ABSTRACT

A method for skeletonizing the strands of a composite material part in a 3D image having a step of detecting oriented section centers of the strands and a link from each center to the closest center having the same orientation, the detection being carried out by means of at least one reference volume having an oriented centered strand pattern, the detection step having, for each reference volume: •a step of determining portions of the image, •a step of calculating a correlation score between the reference volume and each (Continued)

portion associated with the central voxel of each portion, so as to obtain a correlation score for each voxel of the image; and •a step of determining the strand centers corresponding to the voxels having a correlation score which corresponds to a local maximum.

10 Claims, 10 Drawing Sheets

(52) U.S. Cl.
CPC .............. *G06T 2207/10081* (2013.01); *G06T 2207/20044* (2013.01); *G06T 2207/30172* (2013.01)

(58) Field of Classification Search
CPC ............ G06T 2207/30172; G06T 7/12; G06V 10/761; G06V 10/34; G06V 30/168
See application file for complete search history.

(56) References Cited

OTHER PUBLICATIONS

Search Report from the French Intellectual Property Office on corresponding FR application (FR2003093) dated Nov. 19, 2020.
International Search Report and Written Opinion on corresponding PCT application (PCT/EP2021/056463) from International Searching Authority (EPO) dated May 12, 2021.
Michael W. Czabaj et al., "Numerical reconstruction of graphite/epoxy composite microstructure based on sub-micron resolution X-ray computed tomography," Composites Science and Technology, Amsterdam, NL, vol. 105, Dec. 1, 2014, pp. 174-182.
Peter J. Creveling et al., "A fibre-segmentation algorithm for composites imaged using X-ray microtomography: Development and validation," Composites Part A: Applied Science and Manufacturing, Amsterdam, NL, vol. 126, Nov. 1, 2019, p. 105606.

* cited by examiner

[Fig. 2]

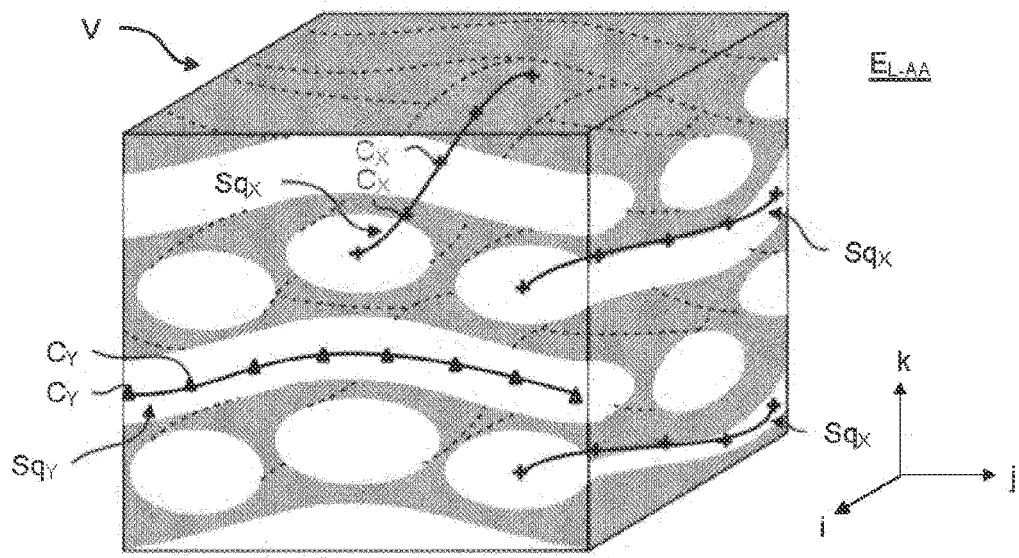

METHOD AND SYSTEM FOR SKELETONIZING STRANDS OF A COMPOSITE MATERIAL PART IN A 3D IMAGE

TECHNICAL FIELD

The present invention relates to the field of the determination of the internal structure of a composite material part, and more particularly targets a method and a system for skeletonizing the strands of a composite material part in a 3D image.

BACKGROUND

A composite material vane 1 is known in the prior art, of which a portion of the wall is illustrated in [FIG. 1], comprising reinforcement fibers F, for example made of carbon, embedded in a matrix G, such as an organic matrix based on polymer resin, serving as binder and conferring on the vane 1 its external shape. In a known manner, the reinforcement fibers F are organized into bundles of fibers, known by the term "strands TX, TY", comprising of the order of one hundred or one thousand or so reinforcement fibers F woven or aligned with one other. The strands TX, TY are for their part arranged between each other by weaving and/or stacking, such as in the example of [FIG. 1], a stacking of longitudinal strands TX woven with transversal strands TY according to an orthogonal coordinates system (X, Y, Z) defined by the direction of the stack Z, the longitudinal direction X and the transversal direction Y.

To verify the mechanical properties of a composite material vane 1 and notably its resistance to damage, an analysis based on the external shape of the vane 1 is not sufficient. It is in fact necessary to analyze the position and the shape of the strands $T_X$, $T_Y$ within the vane 1 in order to detect an internal defect. In particular, it is desired to detect strands $T_X$, $T_Y$ that are broken or damaged or instead irregularities in their weaving.

To do so, as illustrated in [FIG. 2], it is known to acquire by tomography a 3D image in gray levels N of the vane 1 from a large number of 2D radiographies obtained by bombarding the vane 1 with X-rays along different angles. Such a 3D image, designated "tomographic volume V" hereafter, is divided into voxels vox extending according to an orthogonal coordinates system i, j, k. Each voxel vox comprises a given gray level N, corresponding to the average coefficient of absorption of X-rays of the zone of vane 1 illustrated on the voxel vox. The voxels vox of dark gray levels N thus correspond to a zone of vane 1 mainly comprising a material of low coefficient of absorption of X-rays N2, namely the matrix G. The voxels vox of light gray levels N correspond for their part to a zone of vane 1 mainly comprising a material of high coefficient of absorption N1, namely the strands TX, TY.

In practice, a composite material vane 1 used in the aeronautics industry has a density of strands $T_X$, $T_Y$ comprised between 80% and 90%, that is to say that the strands $T_X$, $T_Y$ are arranged in a very compacted manner within the matrix G, making the identification of the strands $T_X$, $T_Y$ difficult in the tomographic volume V. Further, the range of gray levels differs from one 2D radiography to the other as a function of the acquisition conditions. The tomographic volume V is further imperfect, comprising artefacts, making the identification of the strands $T_X$, $T_Y$ all the more complex.

With reference to [FIG. 3], to analyze the shape and the position of the strands TX, TY in the tomographic volume V, a method is known for skeletonizing the strands TX, TY by ED-AA detection then EL-AA linking of oriented section centers CX, CY of each strand TX, TY in the tomographic volume V. In the example of [FIG. 4], the longitudinal CX and transversal CY centers of respectively longitudinal TX and transversal TY strands are thus determined by the ED-AA detection detailed hereafter then the centers CX, CY associated with a same strand TX, TY are linked together. The curves obtained are designated "skeletons SqX, SqY of the strands TX, TY" and make it possible to access the position of the strands TX, TY in the tomographic volume V.

More precisely, with reference to [FIG. 5], the ED-AA detection of the centers CX, CY of the strands TX, TY is carried out in a known manner on slices WX, WY of the tomographic volume V normal to the axis of the strands TX, TY. In this example, the longitudinal CX and transversal CY centers are thus determined on slices WX, WY respectively normal to the longitudinal axis X and the transversal axis Y, designated "longitudinal slices WX" and "transversal slices WY". In a known manner, an operator annotates manually the centers CX, CY on around 1% of the slices WX, WY by visual interpretation of the gray levels N. For each strand, the centers CX, CY of the other slices WX, WY are next determined by interpolation from the centers CX, CY determined manually.

Such a method for skeletonizing the strands $T_X$, $T_Y$ of a vane 1 is laborious and costly in time and in resources. In particular, manual annotation requires around five working days to determine the skeleton $Sq_X$, $Sq_Y$ of around 800 strands $T_X$, $T_Y$. Manual annotation is further subject to a potential error and an interpretation specific to the operator, which also affects the precision of the interpolated centers $C_X$, $C_Y$. Further, such a skeletonization method does not make it possible to detect defects among the interpolated centers.

To overcome these drawbacks, it is known from the article entitled "A 3D image analysis method for fibrous microstructures: Discretization and fibers tracking" published in 2012, to binarize the tomographic volume by assigning a first label to light gray level zones and a second label to dark gray level zones. The detection of the centers of the strands is next carried out by determining the centers of the first label zones, attributed to the strands. Such a method does not however enable an exact and precise skeletonization of the strands $T_X$, $T_Y$ of a vane 1 of high density of strands $T_X$, $T_Y$, the binarization then leading to extended first label zones of several contiguous strands indistinguishable from one another. The article "Towards the 3D in-situ characterization of deformation micro-mechanisms within a compressed bundle of fibres", published in 2011, also teaches binarizing the tomographic volume then detecting, on several sections, the centers of the label zones attributed to the strands.

It is also known from the article "FiberScout: an interactive tool for exploring and analyzing fiber reinforced polymers" published in 2014 to determine, directly on the tomographic volume, the skeleton of the strands from the positions of their extremities and their local orientation at several points. The local orientation of a strand at a given point is obtained by determining, for a given voxel, the neighboring voxel of gray level the closest thereto. Such a method does not enable either an exact and precise skeletonization for a vane 1 of high density of strands $T_X$, $T_Y$, the determination of the local orientation of the strands being able to be falsified by the proximity of neighboring strands, in particular contiguous, and by artefacts of the tomographic volume. The article entitled "Composites: Part A, Fiber orientation measurements in composite materials" published in 2006 also describes a method for skeletonizing from the orientation of the strands, by determining a slice of the tomographic volume of normal neither parallel nor orthogonal to the axis of the strands, such that the sections of the strands on the slice are substantially elliptical. The orientation of the strands is then determined from the elliptical shape of the sections. This method has however the same drawbacks as previously.

Incidentally, from the article "Analysis of woven fabric structure using X-ray CT images" published in 2005 is known a method for skeletonizing the threads of a fabric in a tomographic volume, in order to analyze its weaving. Firstly, slices of normal orthogonal to the axis of the threads of the fabric are determined in the tomographic volume and binarized such as described previously. The centers of the threads of fabric are next annotated manually on a first slice. On the next neighboring slice, the centers of the threads are determined by correlation with the centers determined on the first slice, by searching for each center of a thread in a restricted calculation region around the center of the same thread of the first slice. The correlation is realized successively on each of the following slices, step by step. Such a method is not very robust, because if a center is poorly determined on a section, the errors risk being propagated to the following slices. Further, such a method requires a binarization not suited for a vane 1 of high density of strands $T_x$, $T_y$, besides in which the fibers F are embedded in a matrix G unlike the threads of the fabric.

It is also known from the article "Numerical reconstruction of graphite/epoxy composite microstructure based on sub-micron resolution X-ray computed tomography" (Composite Science and Technology—105 2014/174-182) a method for digital reconstruction of the unidirectional fibers of a composite material wherein the centers are determined in 2D sections, by attributing a correlation score to each pixel by comparison with a stencil. The centers of the fibers are next linked by prediction/correction. Such a method has the same drawbacks as previously, namely being not very precise and subject to the propagation of errors.

The invention thus targets a method and a system for skeletonizing the strands of a composite material vane in a 3D image, and more generally of a composite material part, which is precise, reliable and rapid to implement.

SUMMARY

The invention relates to a method for skeletonizing the strands of a composite material part in a 3D image of said part, said image comprising a plurality of voxels extending in an orthogonal coordinates system and each comprising a gray level, said method comprising:
 a phase of detecting a plurality of oriented section centers of the strands of the part in the image, and
 a phase of linking each center to the closest center of same orientation, in order to link the centers associated with a same strand, so as to obtain the skeleton of the strands of said part.

The invention is remarkable in that the detection phase is implemented by means of at least one reference volume comprising a plurality of voxels, said voxels extend in the orthogonal coordinates system and each comprising a gray level in such a way that the reference volume comprises a centered strand pattern extending along a given direction, said detection phase comprising, for each reference volume:
 a step of determining portions of the image comprising a central voxel and of dimension equal to that of the reference volume,
 a step of calculating a correlation score between the reference volume and each portion of the image by comparison of the gray level of their respective voxels, said correlation score being associated with the central voxel of each portion, so as to obtain a correlation score for each voxel of the image forming a matrix of correlation scores, and
 a step of determining the oriented section centers of the strands of the part, said centers corresponding to the voxels of the image of which the correlation score corresponds to a local maximum of the matrix of correlation scores, the orientation of said centers being defined by the direction of the strand pattern of the reference volume.

It is specified here that strand pattern designates a pattern of a transversal slice of strand inscribed in the reference volume. In other words, the strand pattern represents a strand truncated in the direction of the length and of which the section is entirely represented.

Thanks to the invention, the phase of detecting the section centers of the strands is carried out by correlation of images with one or more reference volume(s) which, compared to a manual annotation, enables a saving in time and resources in operators and limits the risk of error and of interpretation specific to an operator. Such a detection is also more reliable and more precise because it is based on a correlation of images with one or more reference volume(s) of several voxels comprising at least one strand pattern, which makes it possible to properly discern the strands and is less sensitive to artefacts and local differences of gray levels within the 3D image of the part. In other words, such a detection enables a global correlation in portions of the 3D image of the part, which is more relevant than binarization or the determination of the local orientation of the strands of the prior art. Furthermore, such a detection is more precise because it does not require interpolation as in the prior art, which makes it possible to detect local anomalies and/or discontinuities of strands which were not visible by interpolation.

According to one aspect of the invention, the skeletonization method is a method for skeletonizing the strands of a composite material part comprising a density of strands greater than 50%, preferably comprised between 80% and 90%. In an advantageous manner, such a skeletonization method makes it possible to properly discern the strands compacted within a matrix, in other words contiguous, which was not allowed by the binarization or the determination of the local orientation of the strands of the prior art.

Preferably, the step of determining portions is implemented for each voxel of the image of the part, in order to obtain the global skeleton of the strands of the part in the image.

According to one aspect of the invention, the detection phase is implemented by means of a plurality of reference volumes, the strand patterns of said reference volumes extending along different given directions. In an advantageous manner, the reference volumes make it possible to detect the strands of any direction in the image of the part, by means of different strand patterns of corresponding orientation. The skeletonization method thus enables a complete skeletonization of the strands of the part, in particular in all directions.

According to another aspect of the invention, the detection phase is implemented by means of a plurality of reference volumes, the strand patterns of said reference volumes comprising different sections. It is specified that the section of a strand pattern differs from that of another strand pattern by its shape and/or its size. In an advantageous manner, the reference volumes make it possible to detect strands of any section of the 3D image of the part, in particular any shape and any size, by means of different strand patterns of corresponding section. The skeletonization method thus enables a complete skeletonization of the strands of the part, in particular of all sections.

According to one aspect, at least one reference volume comprises around the strand pattern a neighborhood comprising at least one neighboring strand pattern. Advantageously, a reference volume comprises a central strand pattern and one or more neighboring strand patterns, whole or partial, which makes it possible to realize a correlation of images that is not limited to the strand but also analyzes the neighborhood. Such a correlation is thus more reliable and more precise.

According to one aspect of the invention, the detection phase is implemented by means of a plurality of reference volumes, the strand patterns of said reference volumes comprising different neighborhoods. It is specified that the neighborhood of a reference volume differs from that of another reference volume by the presence or not of one or more strand pattern(s), by their position and/or by their section. In an advantageous manner, the reference volumes make it possible to detect strands of different neighborhoods of the 3D image of the part, in particular having neighboring strands or not and more or less compacted. The skeletonization method thus enables a complete skeletonization of the strands of the part, in particular of all neighborhoods.

Preferably, the detection phase is implemented by means of a plurality of different reference volumes in that the strand pattern of each reference volume extends along a different given direction and/or comprises a different section and/or comprises a different neighborhood. Advantageously, a plurality of reference volumes comprising a panel of different strand patterns makes it possible to skeletonize all the strands of the 3D image of the part, and does so in a precise and reliable manner.

According to one aspect of the invention, when the detection phase is implemented by means of a plurality of reference volumes, the skeletonization method comprises a step of selecting the maximum correlation score associated with each voxel of the 3D image of the part. This advantageously enables a gain in precision and in reliability by seeking the best correlation among different strand patterns.

According to another aspect of the invention, the skeletonization method comprises a preliminary step of determining at least one reference volume by selecting a portion or an average of portions of the 3D image of the part comprising a central voxel and comprising a centered strand pattern extending along a given direction. Advantageously, a reference volume is adapted to the 3D image of the part to analyze. In particular, a reference volume comprises the same range of gray levels and comprises a strand pattern similar to the strands present in the part.

According to another aspect, at least one reference volume is obtained by computer tomography simulation. Advantageously, a reference volume may be determined easily without preliminary analysis of the 3D image of the part, in particular by an operator. Further, such a reference volume is universal and does not correspond to a strand in particular of the part, which could correspond to an exception.

According to one aspect, the skeletonization method comprises a preliminary step of filtering the 3D image of the part, preferably by a Gabor filter. In an advantageous manner, such a filter enables a better perception of the strands being able to improve the detection of the centers.

According to one aspect of the invention, the linking phase comprises:
 a step of calculating, for each oriented section center, the distance separating it from the closest center of same orientation, and
 when the distance is less than a maximum distance, a step of plotting the curve linking each center to the closest center of same orientation.

In an advantageous manner, such a linking phase is simple and reliable to realize. Such a linking phase is further reliable and makes it possible to check that the centers are not too far from one another, which could indicate a potential strand defect, such as a discontinuity.

Preferably, when the distance is greater than the maximum distance, a manual visual inspection of the phase of detecting the centers is carried out by an operator. In an advantageous manner, the expertise of an operator for the analysis of local zones where the centers are abnormally spaced apart increases the precision and the reliability of the skeletonization method.

The invention also relates to a skeletonization system for the implementation of the method for skeletonizing the strands of a composite material part in a 3D image of said part such as described previously, said skeletonization system comprising at least one database comprising at least one reference volume comprising a centered strand pattern extending along a given direction, said skeletonization system comprising at least one calculation member which, for each reference volume, is configured to:
 determine portions of the image of dimension equal to that of the reference volume,
 calculate a correlation score between the reference volume and each portion of the image by comparison of the gray level of their respective voxels, said correlation score being associated with the central voxel of each portion, so as to obtain a correlation score for each voxel of the image forming a matrix of correlation scores, and
 determine the oriented section centers of the strands of the part, said centers corresponding to the voxels of the image of which the correlation score corresponds to a local maximum of the matrix of correlation scores, the orientation of said centers being defined by the direction of the strand pattern of the reference volume,
 said calculation member being in addition configured to link each center to the closest center of same orientation, in order to link the centers associated with a same strand, so as to obtain the skeleton of the strands of the part.

Advantageously, such a skeletonization system makes it possible to obtain automatically the skeleton of the strands of a part, without the aid of an operator, thanks to a database filled beforehand. Such a database may further be improved as and when it is used, through feedback.

Preferably, the calculation member is configured to determine at least one reference volume by computer tomography simulation.

Preferably, the calculation member is configured to filter the 3D image of the part, preferentially by a Gabor filter.

Preferably, in the case of a plurality of reference volumes, the calculation member is configured to select the maximum correlation score associated with each voxel of the 3D image of the part.

BRIEF DESCRIPTION OF THE DRAWINGS

The invention will be better understood on reading the description that follows, given uniquely as an example, and by referring to the appended drawings given as non-limiting examples, in which identical references are given to similar objects and in which:

FIG. 3 is a schematic representation of a method for skeletonizing the strands of the portion of vane wall of [FIG. 1] in the tomographic volume of [FIG. 2] according to the prior art;

FIG. 4 is a schematic representation of a phase of linking oriented section centers of the strands according to the skeletonization method of [FIG. 3];

It should be noted that the figures set out the invention in a detailed manner for implementing the invention, said figures obviously being able to serve to better define the invention if needs be.

DETAILED DESCRIPTION

Figure 1:
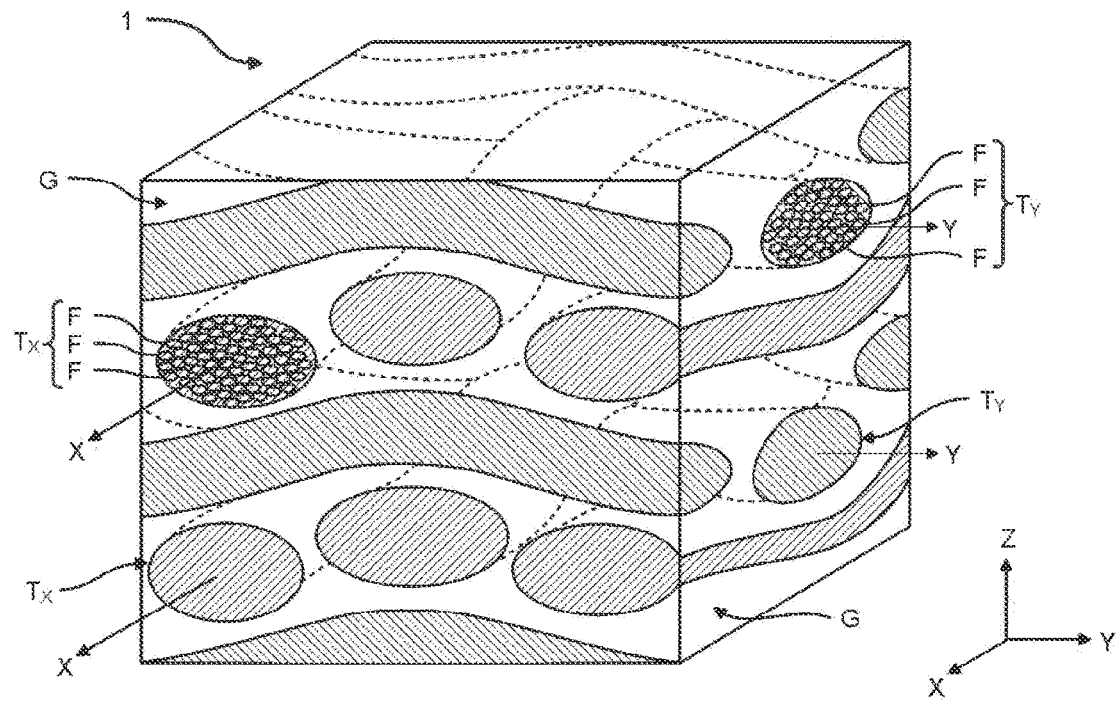
FIG. 1 is a schematic representation in gray levels of a portion of the wall of a composite material vane comprising strands according to the prior art.
Figure 2:
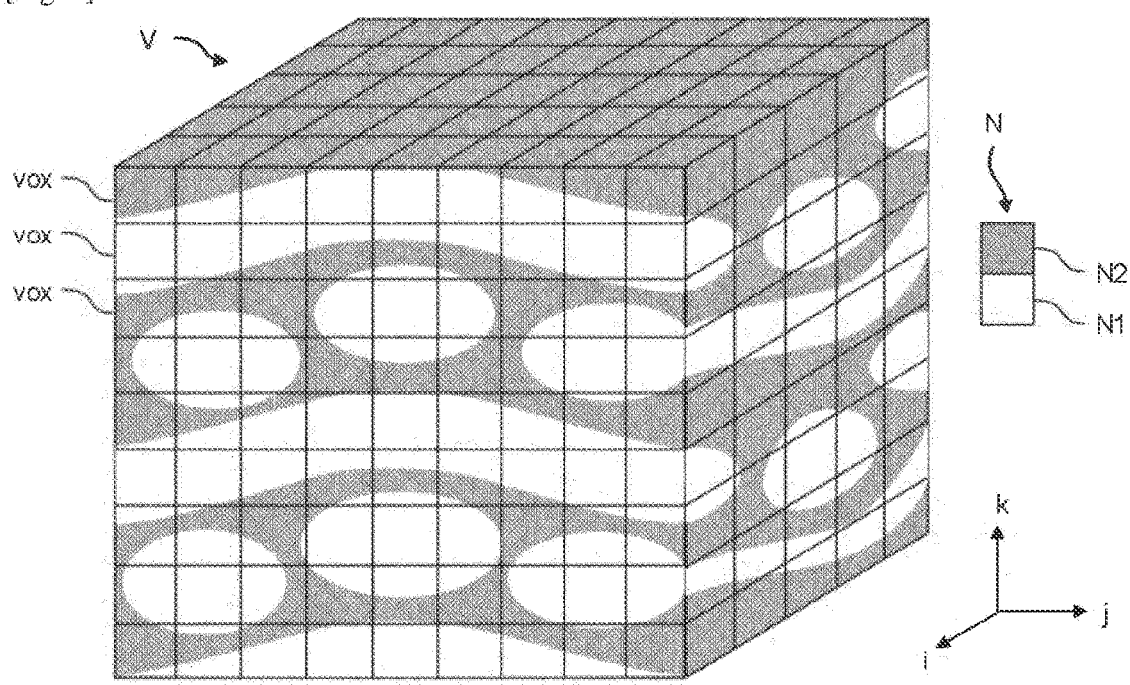
FIG. 2 is a schematic representation in perspective of a tomographic volume of the portion of vane wall of [FIG. 1]
Figure 5:
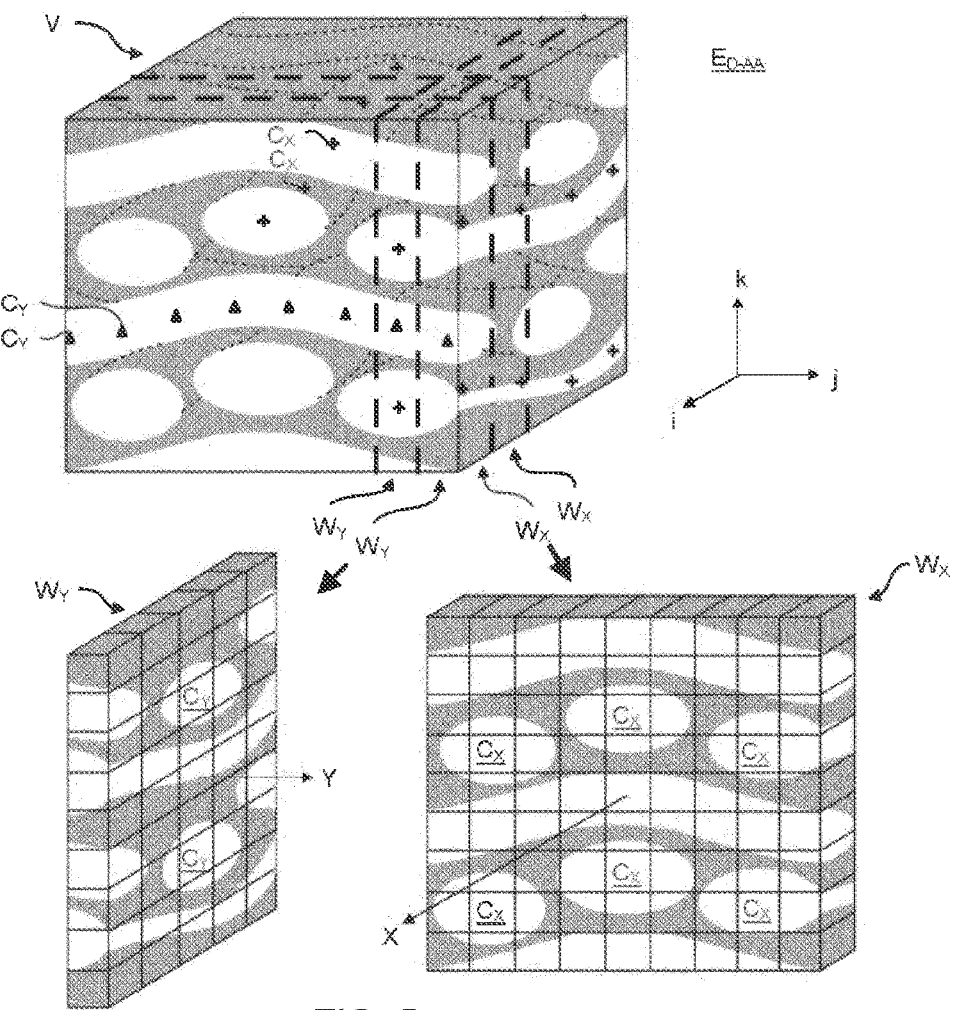
FIG. 5 is a schematic representation of a phase of detecting oriented section centers of the strands according to the skeletonization method of [FIG. 3]
Figure 6:
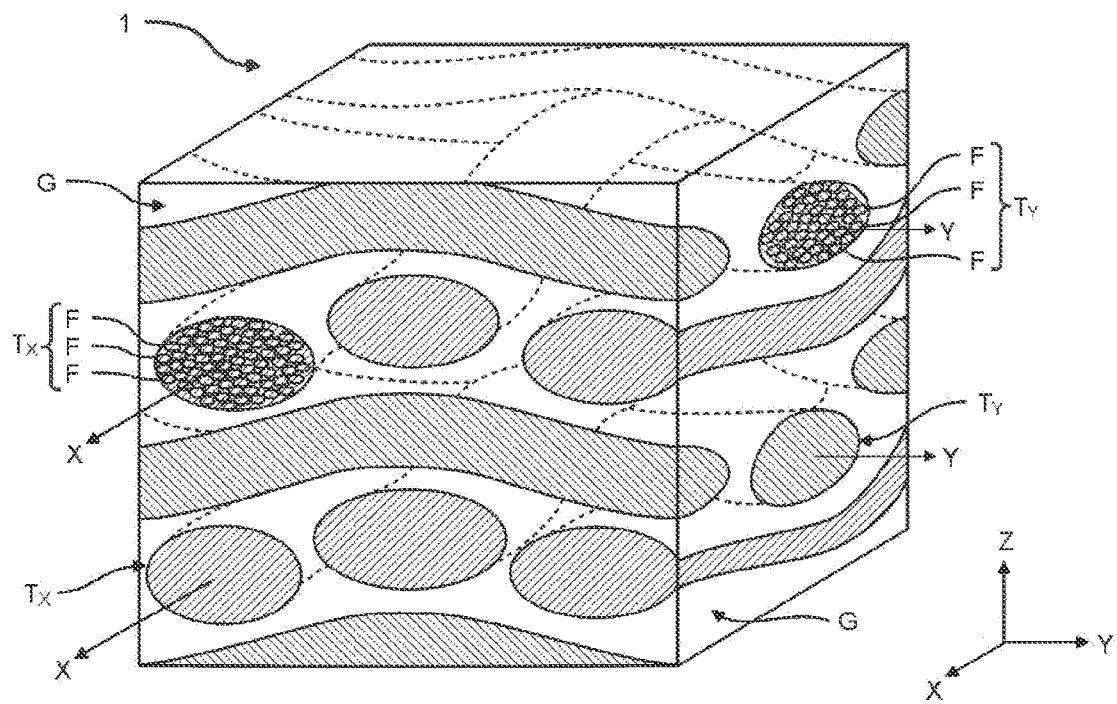
FIG. 6 is a schematic representation in perspective of a portion of composite material vane wall comprising strands according to the invention.

A composite material vane 1 is considered of which a portion of the wall is represented in [FIG. 6], of which it is sought a determine the internal structure in order to verify the mechanical properties of the vane 1 and notably its resistance to damage.

In a known manner and with reference to [FIG. 6], such a vane 1 comprises reinforcement fibers F, for example made of carbon, embedded in a matrix G, such as an organic matrix based on polymer resin, serving as binder and conferring on the vane 1 its external shape, the reinforcement fibers F are organized into bundles of fibers, known by the term "strands TX, TY", comprising of the order of one hundred or one thousand or so reinforcement fibers F woven or aligned with one another. The strands TX, TY are for their part arranged between them by weaving and/or stacking, such as in the example of [FIG. 6], a stack of longitudinal strands TX woven with transversal strands TY according to an orthogonal coordinates system (X. Y, Z) defined by the direction of the stack Z, the longitudinal direction X and the transversal direction Y. In the example of [FIG. 6], the strands TX, TY are spaced apart for the purposes of clarity, but a vane 1 conventionally used in the aeronautical industry has a density of strands TX, TY comprised between 80% and 90%, that is to say that the strands TX, TY are arranged in a very compacted manner within the matrix G. The strands TX, TY of such a vane 1 are thus in practice mainly contiguous with one another.

Figure 7:
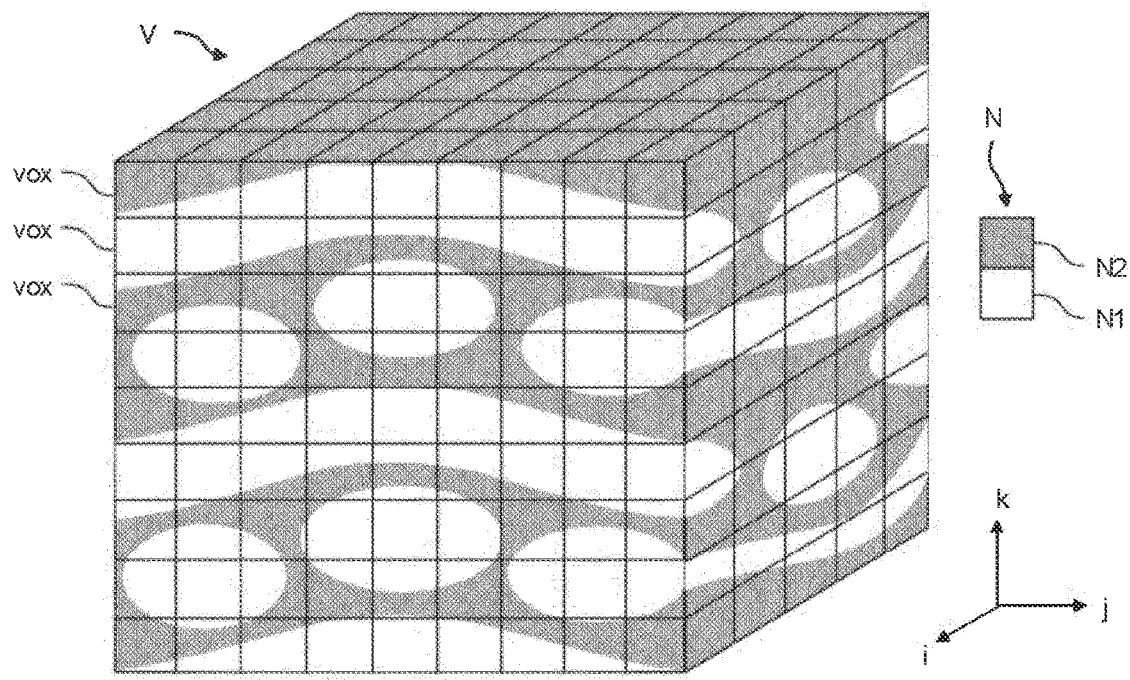
FIG. 7 is a schematic representation in gray levels of a tomographic volume of the portion of vane wall of [FIG. 6]

In a known manner and with reference to [FIG. 7], the internal structure of such a vane 1, and more precisely the shape and the position of the strands TX, TY of the vane 1, is determined in a 3D image in gray levels N of the vane 1 obtained by tomographic acquisition from a large number of 2D radiographies obtained by bombarding the vane with X-rays along different angles. Such a 3D image, designated "tomographic volume V" hereafter, is divided into voxels vox extending according to an orthogonal coordinates system i, j, k. Each voxel vox comprises a given gray level N, corresponding to the average coefficient of absorption of X-rays of the zone of vane 1 illustrated on the voxel vox. The voxels vox of dark gray levels N thus correspond to a zone of vane 1 mainly comprising a material of low coefficient of absorption of X-rays N2, namely the matrix G. The voxels vox of light gray levels N correspond for their part to a zone of vane 1 mainly comprising a material of high coefficient of absorption N1, namely the strands TX, TY. As an example, the voxel vox in the upper left corner is a voxel of dark gray level N, because the corresponding zone of vane 1 comprises around 80% of matrix G (material of low coefficient of absorption N2) and 20% of strands TX, TY (material of high coefficient of absorption N1). Generally speaking, the gray level N of each voxel vox of [FIG. 7] is to be interpreted from the percentage of material of low coefficient of absorption N2 and of high coefficient of absorption N1. It should be noted that the voxels vox represented in [FIG. 7] are of large size uniquely for the purposes of clarity.

Figure 8:
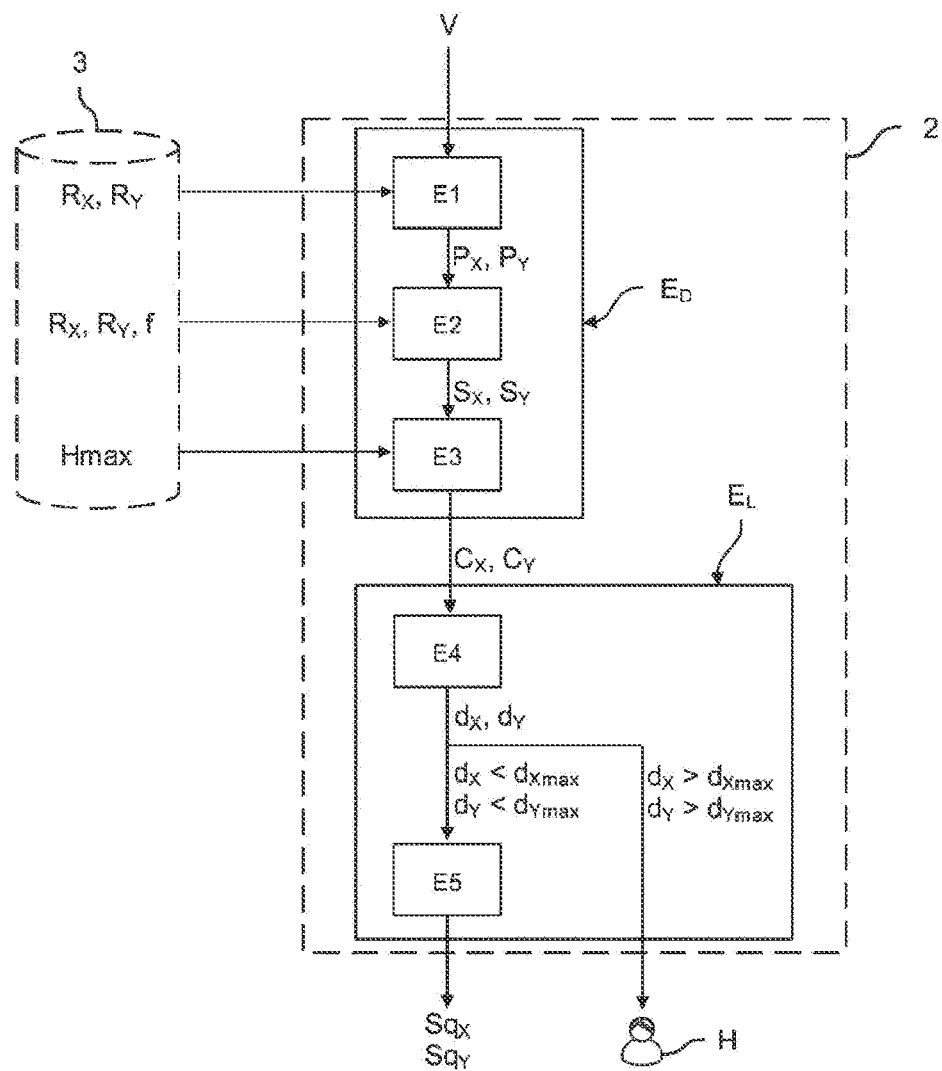
FIG. 8 is a schematic representation of a method and a system for skeletonizing the strands of the portion of vane wall of [FIG. 6] in the tomographic volume of [FIG. 7] according to one mode and one embodiment of the invention.
Figure 9:
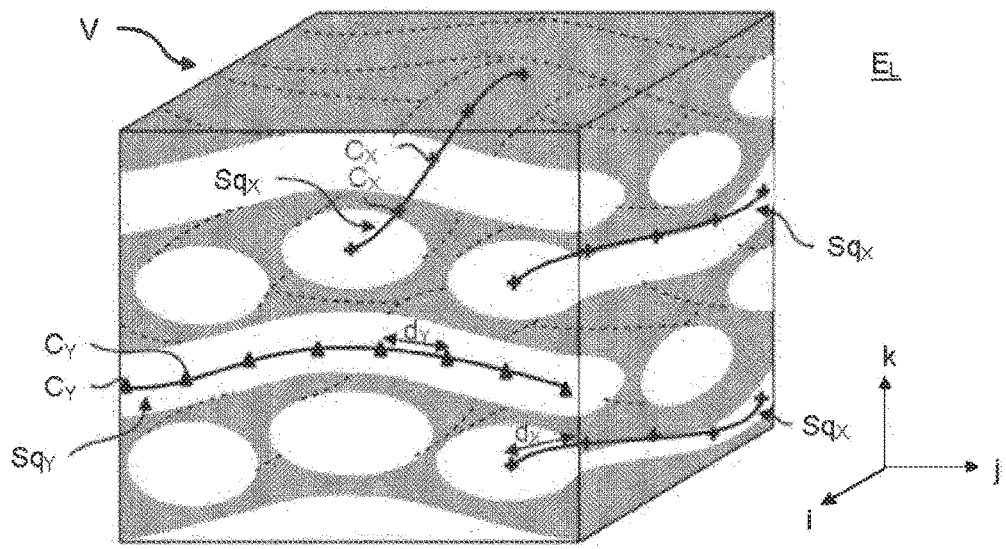
FIG. 9 is a schematic representation of a phase of linking oriented section centers of the strands according to the skeletonization method of [FIG. 8]

As illustrated in FIGS. 8 and 9, the invention relates to a method for skeletonizing the strands $T_X$, $T_Y$ of such a vane 1, which is implemented in the tomographic volume V by determining a guiding curve reflecting the position of each strand $T_X$, $T_Y$, known by the term "skeleton $Sq_X$, $Sq_Y$ of the strands $T_X$, $T_Y$". The skeletonization method according to the invention applies in a general manner to any composite material part and comprises:

a phase of detecting $E_D$ oriented section centers $C_X$, $C_Y$ of the strands $T_X$, $T_Y$ in the tomographic volume V then a phase of linking $E_L$ each center $C_X$, $C_Y$ to the closest center $C_X$, $C_Y$ of same orientation in order to link the centers $C_X$, $C_Y$ associated with a same strand $T_X$, $T_Y$, so as to obtain the skeleton $Sq_X$, $Sq_Y$ of the strands $T_X$, $T_Y$.

Figure 10A:
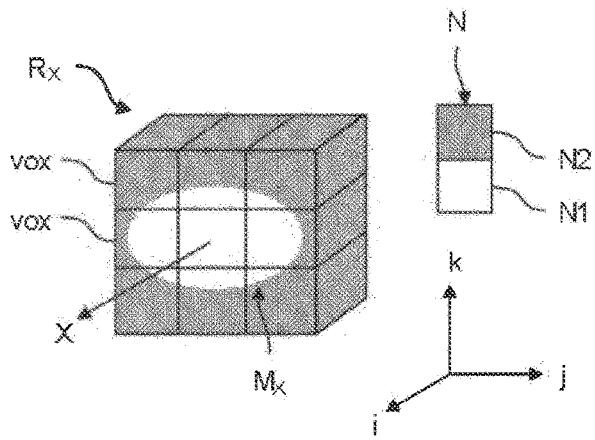
FIG. 10A and
FIG. 10B are schematic representations in perspective of a reference volume comprising respectively a longitudinal strand pattern and a transversal strand pattern for the implementation of a phase of detecting oriented section centers of the strands according to the skeletonization method of [FIG. 8]
Figure 10B:
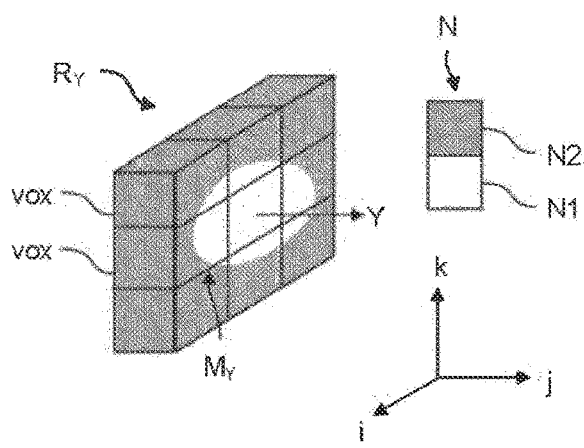

According to the invention and as illustrated in FIGS. 10A and 10B, the detection phase $E_D$ is implemented by means of one or more reference volume(s) $R_X$, $R_Y$ comprising voxels vox, and notably a central voxel, which extend in the orthogonal coordinates system i, j, k of the tomographic volume V and each comprise a gray level N, in such a way that each reference volume $R_X$, $R_Y$ comprises a centered strand pattern $M_X$, $M_Y$ extending along a given direction X, Y. In other words, a reference volume $R_X$, $R_Y$ is a 3D image in gray levels N with a central voxel and a central strand pattern $M_X$, $M_Y$. It is specified here that strand pattern designates a pattern of a transversal slice of strand inscribed in the reference volume. In other words, the strand pattern represents a strand truncated in the direction of the length and of which the section is entirely represented.

Returning to the case of the vane 1, in the example of FIGS. 10A and 10B, the detection phase $E_D$ is implemented by means of two reference volumes $R_X$, $R_Y$, namely a longitudinal reference volume $R_X$ comprising a longitudinal strand pattern $M_X$ and a transversal reference volume $R_Y$ comprising a transversal strand pattern $M_Y$. As will be described hereafter, the reference volumes $R_X$, $R_Y$ may be more numerous and of different natures.

According to the invention and as illustrated in [FIG. 8], such reference volumes $R_X$, $R_Y$ make it possible to implement the detection phase $E_D$ by carrying out for each reference volume $R_X$, $R_Y$:

a step of determining E1 portions $P_X$, $P_Y$ of the tomographic volume V comprising a central voxel and of dimension equal to that of the reference volume $R_X$, $R_Y$, a step of calculating E2 a correlation score $S_X$, $S_Y$ between the reference volume $R_X$, $R_Y$ and each portion $P_X$, $P_Y$ determined by comparison of the gray level N of their respective voxels vox, said correlation score $S_X$, $S_Y$ being associated with the central voxel of each portion $P_X$, $P_Y$ so as to obtain a correlation score $S_X$, $S_Y$ for each voxel vox of the tomographic volume V forming a matrix of correlation scores, and a step of determining E3 the oriented section centers $C_X$, $C_Y$ of the strands $T_X$, $T_Y$ which correspond to the central voxels of the portions $P_X$, $P_Y$ of which the correlation score $S_X$, $S_Y$ corresponds to a local maximum of the matrix of correlation scores, their orientation being defined by the direction X, Y of the strand pattern $M_X$, $M_Y$ of the reference volume $R_X$, $R_Y$.

In the case of the vane 1 of [FIG. 6] and as illustrated in [FIG. 9], the detection phase $E_D$ thus makes it possible to determine centers of longitudinal section $C_X$ and centers of transversal section $C_Y$ from correlation scores $S_X$, $S_Y$ calculated respectively between the longitudinal reference volume RX of [FIG. 10A] and the longitudinal portions PX and between the transversal reference volume RY of [FIG. 10B] and transversal portions PY.

With reference to FIGS. 8 and 9, the linking phase $E_L$ is for its part more precisely implemented by;

a step of calculating E4, for each center of section oriented $C_X$, $C_Y$, the distance $d_X$, $d_Y$ separating it from the closest center $C_X$, $C_Y$ of same orientation, when the distance $d_X$, $d_Y$ is less than a maximum distance $d_{Xmax}$, $d_{Ymax}$, a step of plotting E5 the curve linking each center $C_X$, $C_Y$ to the closest center $C_X$, $C_Y$ of same orientation.

In other words, the linking phase $E_L$ makes it possible to link the centers of longitudinal section $C_X$ together step by step, in the same way as for the centers of transversal section $C_Y$, and thus determine the skeletons of longitudinal strands $Sq_X$ and the skeletons of transversal strands $Sq_Y$ of which some are represented in [FIG. 9].

As illustrated in [FIG. 8], when the calculated distance dX, dY is greater than the maximum distance dXmax, dYmax, an operator H verifies by visual inspection the detection of the section centers CX, CY concerned in the tomographic volume V and, if necessary, manually annotates the section centers CX, CY not detected or displaces poorly detected section centers CX, CY.

In an advantageous manner, the skeletonization method according to the invention enables a saving in time and in resources and limits the risk of error and interpretation specific to the operator, in particular at the level of the phase of detecting $E_D$ the oriented section centers $C_X$, $C_Y$. Indeed, the detection phase $E_D$ is no longer performed by manual annotation of the centers $C_X$, $C_Y$ on the basis of a visual analysis followed by an interpolation between the centers annotated manually, but by correlation of images on the whole of the tomographic volume V. Such a correlation of images is further precise and reliable because it compares one or more oriented reference volume(s) $R_X$, $R_Y$ with portions of the tomographic volume V of several voxels vox. The correlation of images thus attributes a correlation score $S_X$, $S_Y$ to the voxels vox of the tomographic volume V, and more precisely to the central voxels of the portions $P_X$, $P_Y$, which takes into account the neighborhood of the voxels vox, namely the voxels vox situated around the central voxel of each portion $P_X$, $P_Y$. The correlation score is thus more relevant because the correlation of images is not very sensitive to artefacts present in the tomographic volume V inducing global or local differences in ranges of gray levels N in the tomographic volume V due to the acquisition conditions. The correlation of images further makes it possible to highlight local defects which could be masked by the interpolation between centers annotated manually of the prior art.

Further, taking into account the neighborhood of a voxel vox has the advantage of properly discerning contiguous and/or compacted strands $T_X$, $T_Y$, which was not enabled by the skeletonization methods of the prior art using binarization or determining the local orientation of the strands. The skeletonization method according to the invention is thus suited to parts made of composite material of high density of strands $T_X$, $T_Y$ comprised between 80% and 90%. The reliability and the precision of the skeletonization method are further reinforced by resorting to an operator H in the event of abnormal spacing between the centers $C_X$, $C_Y$ in order that he locally verifies the correct detection of the centers $C_X$, $C_Y$.

Each of the steps of the skeletonization method according to the invention will be described hereafter more precisely applied to the determination of the strands TX, TY of the vane 1 of [FIG. 6] and implemented with the longitudinal reference volume RX of FIG. 10A and the transversal reference volume RY of [FIG. 10B]. It should be noted that in the example of FIGS. 10A and 10B, the reference volumes RX, RY are of very small dimension: 3×3×1 voxels in the coordinates system i, j, k for the longitudinal reference volume RX and 3×1×3 voxels for the transversal reference volume RY. In practice, the dimension of a reference volume RX, RY is larger in reality, and this is so for a more reliable and more precise detection of the strands TX, TY. Preferably, the dimension of a reference volume RX, RY is greater than 2×2×2 voxels. This enables a more reliable correlation taking into account the neighborhood of the strand.

It should also be noted that the description that follows could be adapted to any composite material part by replacing the vane 1 by said part. The reference volumes $R_X$, $R_Y$ could also be replaced by other reference volumes in any number, preferably chosen such that their strand patterns are representative of the strands of the part. As an example, the strand patterns must be representative of the orientation of the strands in the part, namely the longitudinal direction X and the transversal direction Y of the longitudinal $T_X$ and transversal $T_Y$ strands for the vane 1 of [FIG. 6].

Figure 11A:
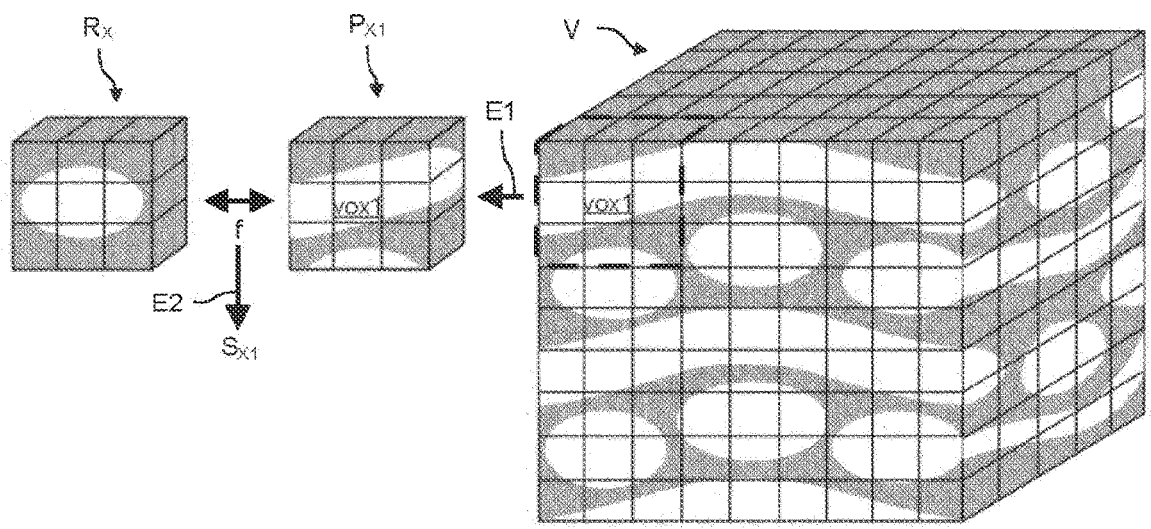
FIG. 11A,
FIG. 11B and
FIG. 11C are schematic representations of a step of determining portions of the tomographic volume and a step of calculating a correlation score for three voxels of the tomographic volume according to the skeletonization method of [FIG. 8]
Figure 11B:
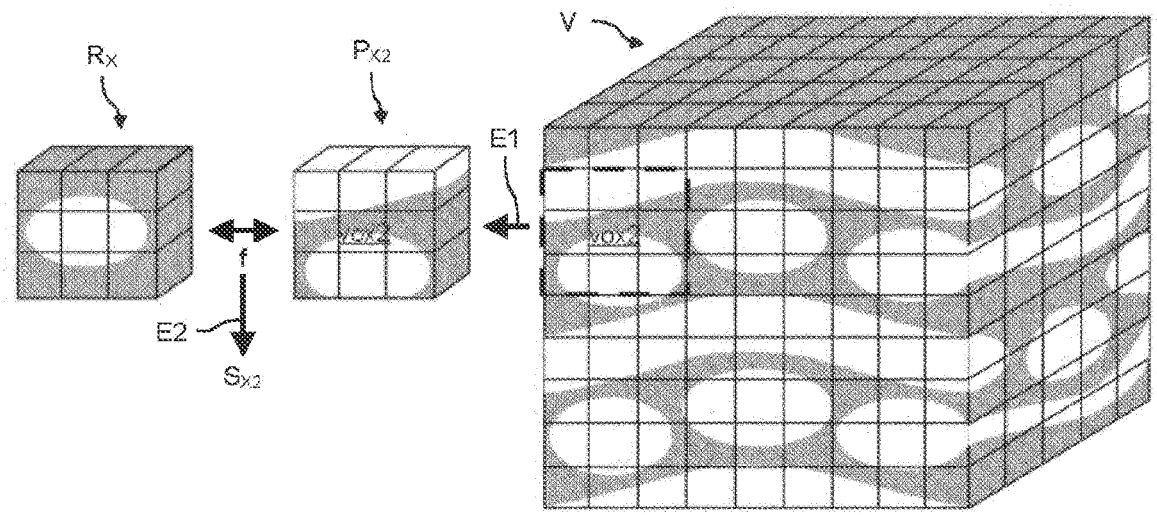
Figure 11C:
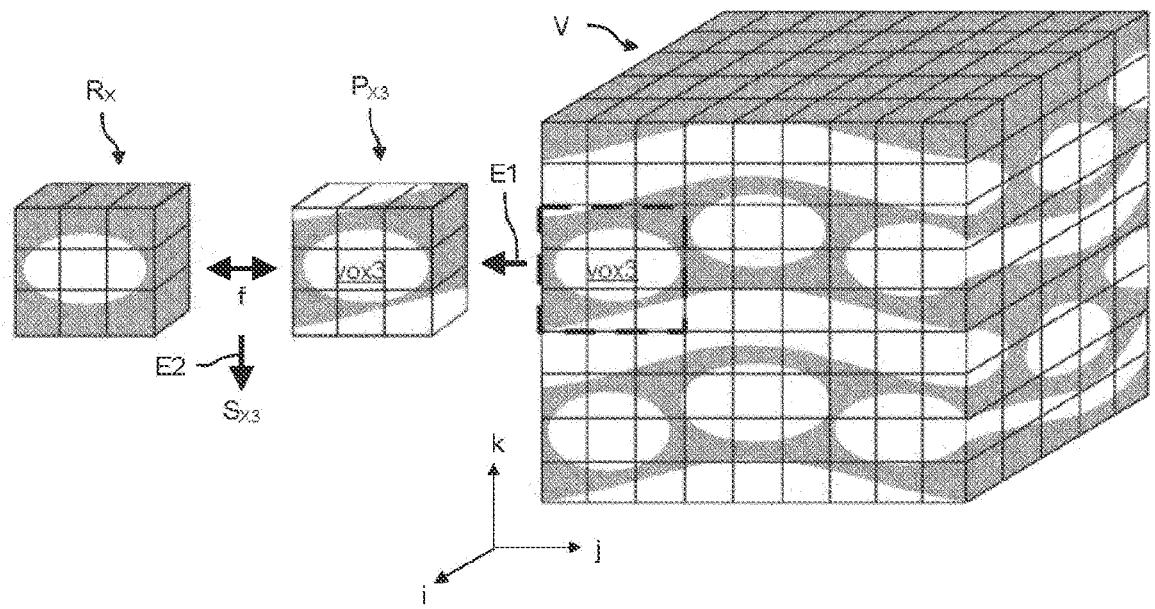
Figure 12:
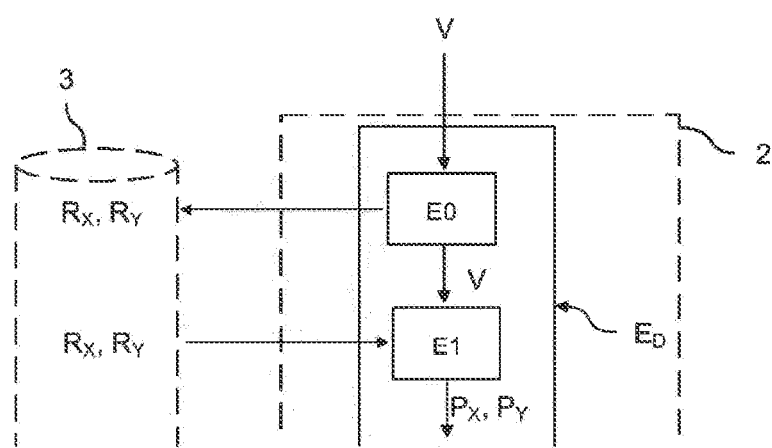
FIG. 12 is a schematic representation of a skeletonization method according to another embodiment of the invention comprising a step of determining at least one reference volume.

With reference to FIGS. 11A, 11B and 11C and as described previously, the skeletonization method starts by a step of determining E1 longitudinal portions $P_X$ of dimension equal to the longitudinal reference volume $R_X$ and transversal portions $P_Y$ of dimension equal to the transversal reference volume $R_Y$. Each longitudinal $R_X$ and transversal $R_Y$ portion comprises a central voxel with which will be associated the correlation score $S_X$, $S_Y$.

As examples, a first longitudinal portion PX1 of first central voxel vox1 is represented in [FIG. 11A], a second longitudinal portion PX2 of second central voxel vox2 is represented in [FIG. 11B] and a third longitudinal portion PX3 is represented in [FIG. 11C]. These three longitudinal portions PX1, PX2, PX3 are of dimension 3×3×1 voxels in the coordinates system i, j, k in the same way as the longitudinal reference volume RX of [FIG. 10A]. In the same way, the transversal portions PY (not represented) are of dimension 3×1×3 voxels in the coordinates system i, j, k in the same way as the transversal reference volume RY of [FIG. 10B]. In the example of FIGS. 10A and 10B, the longitudinal reference volume RX and the transversal reference volume RY are of different dimensions but it goes without saying that their dimensions could be identical, in which case the longitudinal portions PX and the transversal portions PY would be identical.

Preferably, each voxel vox of the tomographic volume V is the central voxel of a longitudinal portion PX and a transversal portion PY so as to calculate a longitudinal correlation score SX and a transversal correlation score SY in each voxel vox of the tomographic volume V. It will thus be remarked that the portions PX, PY are not distinct from one another but each comprise voxels vox common to other portions PX, PY. For example, the first longitudinal portion PX1 [FIG. 11A] and the second transversal portion PX2 [FIG. 11B] comprise six common voxels, of which the first central voxel vox1 and the second central voxel vox2. It will also be remarked that for certain central voxels situated at the extremities of the tomographic volume V, the associated portions PX, PY of the tomographic volume V "overflow" the tomographic volume V, that is to say that they comprise voxels vox of the tomographic volume V designated "real voxels" and fictive voxels.

As described previously and still with reference to FIGS. 11A, 11B and 11C, once the longitudinal $P_X$ and transversal $P_Y$ portions have been determined, the skeletonization method comprises a step of calculating E2 a longitudinal correlation score $S_X$ between the longitudinal reference volume $R_X$ and each longitudinal portion $P_X$ and a transversal correlation score $S_Y$ between the transversal reference volume $R_Y$ and each transversal portion $P_Y$ of the given tomographic volume V, such a correlation score $S_X$, $S_Y$ is calculated by comparing the gray level N of each voxel vox of the reference volume $R_X$, $R_Y$ with that of the corresponding voxel vox of said portion $P_X$, $P_Y$ according to a normalized correlation function f. For a voxel vox of coordinates a, b, c in the coordinates system i, j, k and for a reference volume R and a portion P of dimension a1×b1×c1 voxels, the normalized correlation function f is expressed:

$$f(a,b,c) = \frac{\sum_{i\in a1}\sum_{j\in b1}\sum_{k\in c1} R(i,j,k)\cdot P(a+i,b+j,c+k)}{\sqrt{\sum_{i\in a1}\sum_{j\in b1}\sum_{k\in c1} R^2(a+i,b+j,c+k)}\cdot\sqrt{\sum_{i\in a1}\sum_{j\in b1}\sum_{k\in c1} P^2(a+i,b+j,c+k)}} \quad \text{[Math. 1]}$$

It should be noted that for the central voxels of portions $P_X$, $P_Y$ situated at the extremities of the tomographic volume V, the correlation score $S_X$, $S_Y$ is calculated by comparing the gray level N of each real voxel vox of said portions $P_X$, $P_Y$ uniquely with that of the corresponding voxels vox of the reference volume $R_X$, $R_Y$. In other words, the correlation is carried out uniquely on non-fictive voxels in the case of central voxels situated at the extremities of the tomographic volume V.

The longitudinal correlation score SX and the transversal correlation score SY obtained for each central voxel of portion PX, PY are comprised between 0 and 1, the correlation being all the lower when the score SX, SY is close to 0 and all the higher when the score SX, SY is close to 1. As examples, the calculation of a first longitudinal correlation score SX1 for the first central voxel vox1 is illustrated in [FIG. 11A], that of a second longitudinal correlation score SX2 for the second central voxel vox2 is illustrated in [FIG. 11B] and that of a third longitudinal correlation score SX3 for the third central voxel vox3 is illustrated in [FIG. 11C]. In this example, the third longitudinal portion PX3 comprising a centered strand pattern unlike the first and second longitudinal portions PX1, PX2, the third central voxel vox3 thus comprises the highest longitudinal correlation score SX.

As described previously, once the longitudinal SX and transversal SY correlation scores have been calculated for each voxel vox of the tomographic volume V, the skeletonization method comprises a step of determining E3 the longitudinal CX and transversal CY section centers of the strands TX, TY of the vane 1. To do so, the local maxima of the matrix of correlation scores SX, SX1, SX2, SX3, SY of the tomographic volume V are identified, notably by H-maxima transform Hmax, as referenced in [FIG. 8]. Such a H-maxima transform is known per se by those skilled in the art and a description may be found in chapter 6 in the second edition published in 2003 of the book "Morphological Image Analysis: Principles and Applications" of P. Soille. Returning to the preceding example, only the third longitudinal correlation score SX3 corresponds to a local maximum among the three longitudinal correlation scores SX1, SX2, SX3.

As described previously, the voxels vox, vox1, vox2, vox3 of the tomographic volume V of which the correlation score $S_X$, $S_{X1}$, $S_{X2}$, $S_{X3}$, $S_Y$ corresponds to a local maximum each form a center $C_X$, $C_Y$. These different centers $C_X$, $C_Y$ are oriented, the orientation of a center $C_X$, $C_Y$ being defined by the longitudinal X or transversal Y direction of the strand pattern $M_X$, $M_Y$ of the reference volume $R_X$, $R_Y$ from which is derived the correlation score $S_X$, $S_Y$. Still taking the preceding example, only the third central voxel vox3 is designated longitudinal section center $C_X$.

Preferably, the H-maxima transform Hmax is implemented by means of a minimum contrast height sufficiently large to not determine centers $C_X$, $C_Y$ corresponding to artefacts of the tomographic volume V and sufficiently small to determine all of the centers of strands $T_X$, $T_Y$ of the vane 1. In fact, the value of the minimum contrast height is directly linked to the choice of the reference volumes $R_X$, $R_Y$. The more the reference volumes $R_X$, $R_Y$ comprise a strand pattern $M_X$, $M_Y$ close to the strands $T_X$, $T_Y$ of the vane 1 and the more the value of the minimum contrast height will able to be large, and thus the discriminating correlation. In practice, the value of the minimum contrast height is chosen by feedback. It should be noted that the minimum contrast height may be different for each reference volume $R_X$, $R_Y$. In this example, there could thus be a minimum longitudinal and a transversal contrast height.

The three steps described previously enable the detection ED of the longitudinal CX and transversal CY section centers respectively of the longitudinal TX and transversal TY strands of the vane 1. As described previously and with reference to [FIG. 9], the determination of the skeletons $Sq_X$, $Sq_Y$ of the strands $T_X$, $T_Y$ of the vane 1 is next carried out by linking EL the centers CX, CY which have been detected previously.

With reference to FIGS. 8 and 9, the linking phase $E_L$ starts by a step of calculating $E_4$, for each longitudinal section center $C_X$, the longitudinal distance $d_X$ separating it from the closest longitudinal section center $C_X$, and for each transversal section center $C_Y$, the transversal distance $d_Y$ separating it from the closest transversal section center $C_Y$. Such a calculation step $E_4$ is implemented by distance transformation and makes it possible to determine the centers $C_X$, $C_Y$ belonging to a same strand $T_X$, $T_Y$ in a simple and reliable manner.

Still with reference to FIGS. 8 and 9, the linking phase $E_L$ continues with a step of plotting $E_5$ the longitudinal skeletons $Sq_X$ of the longitudinal strands $T_Y$ of the vane 1 by linking the longitudinal centers $C_X$ the closest to one another and a step of tracing $E_5$ traversal skeletons $Sq_Y$ of the transversal strands $T_Y$ of the vane 1 by linking the transversal centers $C_Y$ the closest to one another.

However, when the longitudinal distance $d_X$, separating the closest two longitudinal centers $C_X$ is greater than a maximum longitudinal distance $d_{Xmax}$, that is to say that the longitudinal centers $C_X$ are abnormally spaced apart, an operator H verifies by visual inspection the detection of the longitudinal centers $C_X$ concerned in the tomographic volume V and, if necessary, manually annotates longitudinal centers $C_X$ not detected or displaces poorly detected longitudinal centers $C_X$. Such a verification may also be carried out for longitudinal centers $C_X$ abnormally close together. It is carried out in the same way for the transversal centers $C_Y$. In practice, the maximum longitudinal distance $d_{Xmax}$ and the maximum transversal distance $d_{Ymax}$ are chosen as a function of the physical curvature of the strands, the resolution of the tomographic volume V and the orientation of the strands $T_X$, $T_Y$ in the tomographic volume V. It goes without saying that the maximum longitudinal distance $d_{Xmax}$ and the maximum transversal distance $d_{Ymax}$ may be identical.

To summarize, the skeletons $Sq_X$, $Sq_Y$ of the strands $T_X$, $T_Y$ of the vane 1 are determined by phases of detecting $E_D$ then linking $E_L$ centers of longitudinal $C_X$ and transversal $C_Y$ section respectively of the longitudinal $T_X$ and transversal $T_Y$ strands. The longitudinal centers $C_X$ are determined by means of a longitudinal reference volume $R_X$ for which a correlation is carried out with longitudinal portions $P_X$ of the tomographic volume V. The same is true for the transversal centers $C_Y$. The central voxels vox1, vox2, vox3 of the longitudinal $P_X$ and transversal $P_Y$ portions, with the best correlation scores $S_{X1}$, $S_{X2}$, $S_{X3}$, define respectively the longitudinal $C_X$ and transversal $C_Y$ centers, which are next linked step by step.

In an advantageous manner, the correlation is carried out on the basis of one or more reference volumes $R_X$, $R_Y$ comprising a central strand pattern $M_X$, $M_Y$ and not on the basis of one or more reference voxels, which makes the correlation reliable and precise with respect to artefacts and in the case of a high density of strands $T_X$, $T_Y$. Furthermore, the choice of the reference volume(s) $R_X$, $R_Y$ is determining for the correct detection of the strands $T_X$, $T_Y$ of the vane 1. Indeed, the reference volumes $R_X$, $R_Y$ must be representative of all the strands $T_X$, $T_Y$ of the vane 1 to enable a systematic and precise detection. Thus, in the example described previously, a longitudinal reference volume $R_X$ is used to detect the longitudinal centers $C_X$ of longitudinal strands $T_X$ and a transversal reference volume $R_Y$ is used to detect the transversal centers $C_Y$ of transversal strands $T_Y$.

Figure 13:
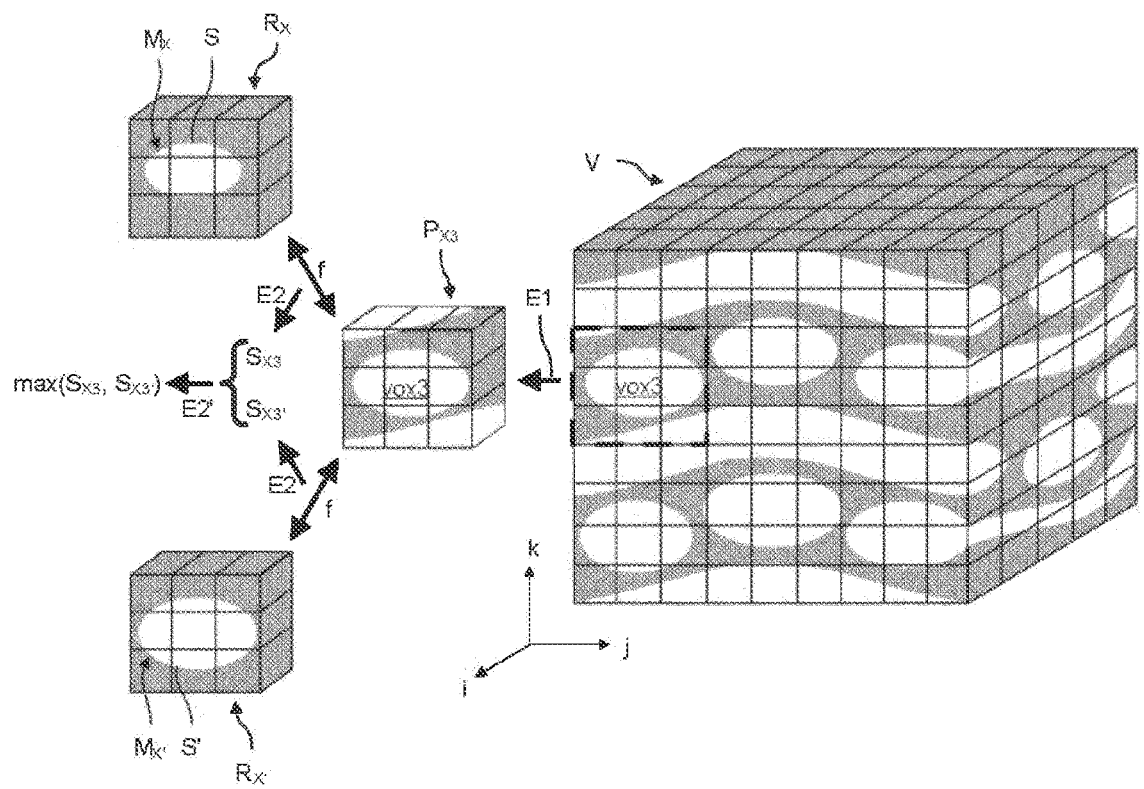
FIG. 13 is a schematic representation of a skeletonization method according to another embodiment of the invention by means of reference volumes comprising strand patterns of different sections.

In order that the reference volumes $R_X$, $R_Y$ are the most representative possible of all the strands TX, TY of the vane 1, according to one preferred embodiment of the invention illustrated in [FIG. 13], the skeletonization method comprises a preliminary step of determining E0 the longitudinal reference volume RX and the transversal reference volume RY directly in the tomographic volume V. To do so, a portion of the tomographic volume V comprising a central voxel and a central strand pattern MX, MY representative of a longitudinal strand TX and of a transversal strand TY of the vane 1 is selected by an operator H. The determination of the longitudinal reference volume RX and the transversal reference volume RY is thus simple and easy to implement and makes it possible to obtain reference volumes RX, RY representative of the strands TX, TY of the vane 1.

In an alternative manner, the reference volumes $R_X$, $R_Y$ may also be determined by computer tomography simulation, which represents a time saving by avoiding having to analyze the tomographic volume V in a preliminary manner.

Furthermore, in the preceding description, the detection $E_D$ of the centers $C_X$, $C_Y$ of the strands $T_X$, $T_Y$ is carried out uniquely by means of two reference volumes $R_X$, $R_Y$, namely a longitudinal reference volume $R_X$ representative of all the longitudinal strands $T_X$, and a transversal reference volume R, representative of all of the transversal strands $T_Y$. In practice, the longitudinal strands $T_X$ and the transversal strands $T_Y$ have sections of different shapes, notably elliptical, and sizes and are more or less close to neighboring strands depending on their position in the vane and/or depending on the local compaction.

Figure 14:
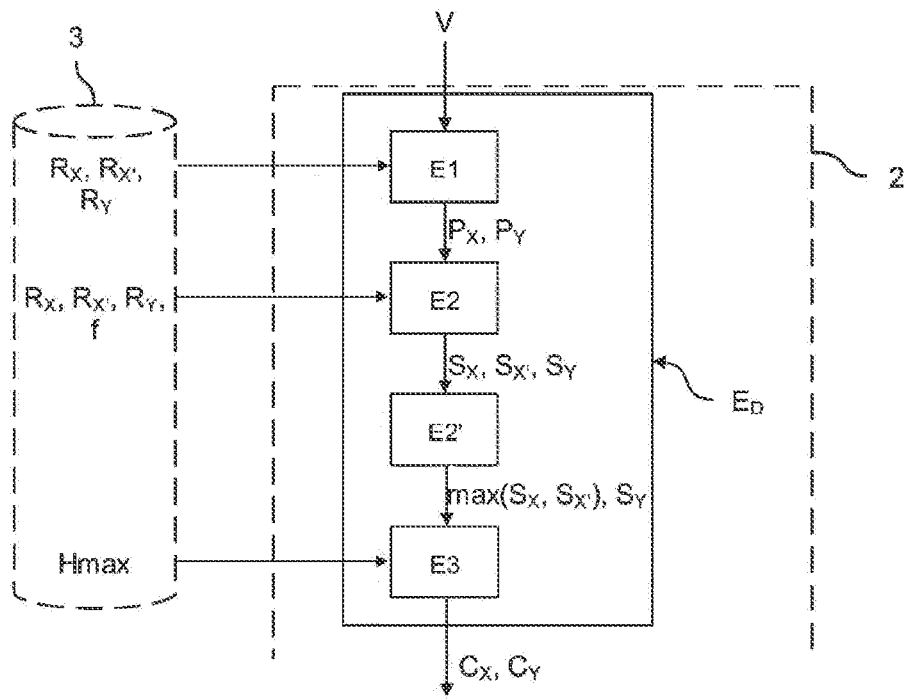
FIG. 14 is a schematic representation of a step of selecting the maximum correlation score associated with a voxel of the skeletonization method of [FIG. 14]

Thus, according to one preferred embodiment of the invention illustrated in [FIG. 14], in order that the reference volumes RX, RY are the most representative possible of all the strands TX, TY of the vane 1, several longitudinal reference volumes RX, RX' and several transversal reference volumes RY comprising a strand pattern MX, MX', MY of different sections S are used to implement the detection ED. The sections S may differ from one another by their size but also by their shape, so as to be representative of each of the strands TX, TY of the vane 1.

In the example of [FIG. 14], two longitudinal reference volumes RX, RX' are used to detect the longitudinal centers CX of the longitudinal strands TX of the vane 1. A first longitudinal reference volume RX comprises a longitudinal strand pattern MX of small elliptical section S and a second longitudinal reference volume RX' comprises a longitudinal strand pattern MX' of large elliptical section S'. The step of determining E1 longitudinal portions PX, the step of calculating E2 longitudinal correlation scores SX and the step of determining E3 longitudinal centers CX are thus implemented for the first longitudinal reference volume RX and for the second longitudinal reference volume RX'. In this example, the two longitudinal reference volumes RX. RX' have the same dimension thus the correlation may be implemented on the same longitudinal portions PX but it goes without saying that the two longitudinal reference volumes RX, RX' could comprise a different dimension. In all cases, at the end of the calculation step E2, the central voxels and notably the third central voxel vox3 of the third longitudinal portion PX3 illustrated in [FIG. 14], comprise two longitudinal correlation scores SX3, SX3'.

Figure 15:
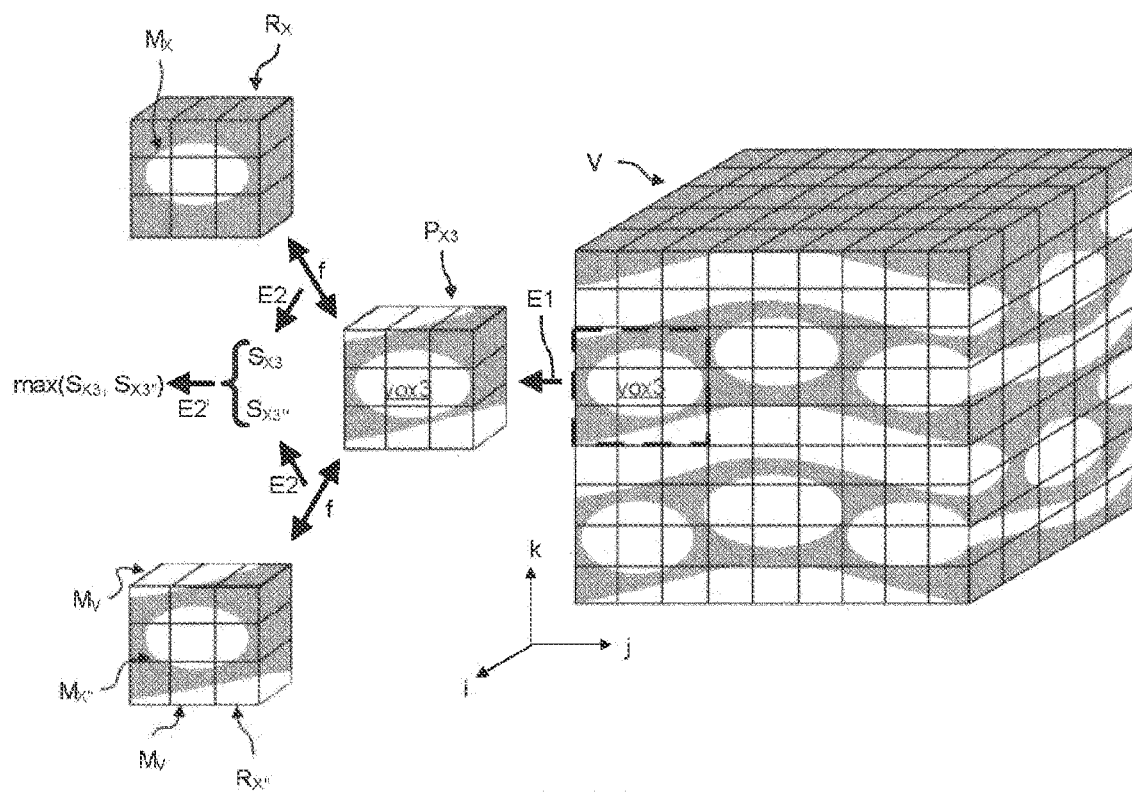
FIG. 15 is a schematic representation of a skeletonization method according to another embodiment of the invention by means of reference volumes comprising strand patterns comprising different neighborhoods.

Preferably, such as illustrated in FIGS. 14 and 15, before the implementation of the determination step $E_3$, the detection phase $E_D$ comprises a step of selecting E2' the maximum longitudinal correlation score $S_{X3}$, $S_{X3}$ associated with each voxel vox3. For the case of the third central voxel vox3, it is thus the correlation score $S_{X3}'$ derived from the second longitudinal reference volume Rx comprising a longitudinal strand pattern Mg of large section elliptical S'. The step of determining E3 the longitudinal centers $C_X$ is thus implemented from the maximum correlation score $S_{X3}$ associated with each voxel vox3.

Another preferred embodiment of the invention is described hereafter in order that the reference volumes RX, RY are the most representative possible of all the strands TX, TY of the vane 1. According to this embodiment illustrated in [FIG. 16], several longitudinal reference volumes RX, RX' and several transversal reference volumes RY comprise a strand pattern MX, MX", MY with different neighborhoods. The neighborhood of a strand pattern MX, MX", MY may differ by the presence or not of neighboring strand patterns MV and by the shape and the position of the latter, in such a way that the reference volumes RX, RX", RY are representative of each of the strands TX, TY of the vane 1, and in particular their different degrees of compaction in the vane 1. A reference volume RX, RX", RY thus comprises one or more strand pattern(s), namely at least one centered strand pattern MX, MX', MY and optionally one or more whole or partial neighboring strand pattern(s) MV.

Figure 16:
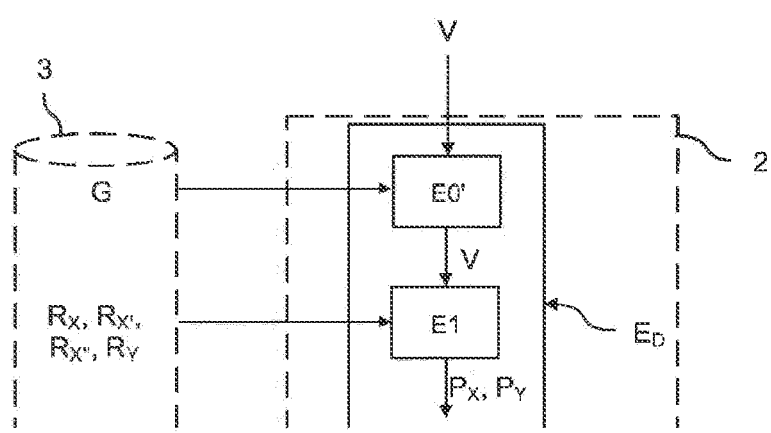
FIG. 16 is a schematic representation of a step of filtering the reference volume of a skeletonization method according to one alternative embodiment of the invention.

In the example of [FIG. 16], two longitudinal reference volumes RX, RX' are used to detect the longitudinal centers CX of the longitudinal strands TX of the vane 1. A first longitudinal reference volume RX comprises a longitudinal strand pattern MX without a neighborhood and a second longitudinal reference volume RX' comprises a longitudinal strand pattern MX' with a neighborhood comprising two partial neighboring strand patterns MV. In the same way as for the preceding embodiment illustrated in [FIG. 14], the step of determining E1 longitudinal portions PX, the step of calculating E2 longitudinal correlation scores SX and the step of determining E3 longitudinal centers CX are thus implemented for the first longitudinal reference volume RX and for the second longitudinal reference volume RX". In the same way as for the preceding embodiment illustrated in [FIG. 14], the two longitudinal reference volumes RX. RX' have the same dimension thus the correlation may be implemented on the same longitudinal portions PX, but it goes without saying that the two longitudinal reference volumes RX, RX' could comprise a different dimension. Preferably, as described previously and illustrated in FIGS. 15 and 16, a step of selecting E2' the maximum correlation score SX3" is implemented before the step of determining E3 the longitudinal centers CX.

Generally speaking, the embodiments shown in FIGS. 10A, 10B, 14 and 16 can be combined with each other. In other words, in practice, the phase of detecting oriented section centers $C_X$, $C_Y$ of the strands $T_X$, $T_Y$ of the vane, and more generally of any composite material part, is implemented with several reference volumes $R_X$, $R_{X'}$, $R_{X''}$, $R_Y$ comprising a strand pattern $M_X$, $M_{X'}$, $M_{X''}$, $M_Y$, along different directions X, Y, of different sections S and of different neighborhoods. In an advantageous manner, the skeletonization method according to the invention makes it possible to detect and to link each strand center in an independent manner unlike the prior art. Indeed, each strand center is determined from a strand pattern without resorting to the other detected strand centers. In addition, the linking step is exempt of interpolation and/or prediction. Indeed, a center is linked to another uniquely as a function of the distance of neighboring centers of same orientation. Resort is not made to the segments of linking centers determined during preceding linking steps.

According to an alternative embodiment of the invention illustrated in [FIG. 16], the skeletonization method comprises in a preliminary manner a step of filtering E0' the tomographic volume V, for example by means of a Gabor filter G, in order to highlight the strand patterns in the tomographic volume V. Such a filtering step E0' is exempt of binarization as in the prior art, which does not make it possible to distinguish contiguous strands from one another.

The invention also relates to a skeletonization system enabling the implementation of the skeletonization method described previously. With reference to [FIG. 8], in the example of the vane 1, such a skeletonization system comprises a calculation member 2, such as a computer, and a database 3. The database 3 is configured to store the reference volumes $R_X$, $R_{X'}$, $R_{X''}$, $R_Y$ acquired by simulation or directly on the tomographic volume V, and the minimum contrast height for the implementation of the H-maxima transform Hmax and the maximum distance dXmax, dYmax. For each reference volume $R_X$, $R_{X'}$, $R_{X''}$, $R_Y$, the calculation member 2 is for its part configured to:

determine portions $P_X$, $P_Y$, $P_{X1}$, $P_{X2}$, $P_{X3}$ of the tomographic volume V of dimension equal to that of the reference volume $R_X$, $R_{X'}$, $R_{X''}$, $R_Y$, calculate a correlation score $S_X$, $S_{X'}$, $S_{X1}$, $S_{X2}$, $S_{X3}$ between the reference volume $R_X$, $R_{X'}$, $R_{X''}$, $R_Y$ and each portion $P_X$, $P_Y$, $P_{X1}$, $P_{X2}$, $P_{X3}$ of the tomographic volume V by comparison of the gray level N of their respective voxels vox, said correlation score $S_X$, $S_{X'}$, $S_{X1}$, $S_{X2}$, $S_{X3}$ being associated with the central voxel vox1, vox2, vox3 of each portion $P_X$, $P_Y$, $P_{X1}$, $P_{X2}$, $P_{X3}$, so as to obtain a correlation score $S_X$, $S_Y$, $S_{X1}$, $S_{X2}$, $S_{X3}$ for each voxel vox of the tomographic volume V forming a matrix of correlation scores, and determine the oriented section centers $C_X$, $C_Y$ of the strands $T_X$, $T_Y$ of the vane 1, said centers $C_X$, $C_Y$ corresponding to the central voxels vox1, vox2, vox3 of the portions $P_X$, $P_Y$, $P_{X1}$, $P_{X2}$, $P_{X3}$ of which the correlation score $S_X$, $S_{X'}$, $S_{X1}$, $S_{X2}$, $S_{X3}$ corresponds to a local maximum of the matrix of correlation scores, the orientation of said centers $C_X$, $C_Y$ being defined by the direction X, Y of the strand pattern $M_X$, $M_Y$, $M_{X'}$, $M_{X''}$ of the reference volume $R_X$, $R_{X'}$, $R_{X''}$, $R_Y$.

The calculation member 2 is in addition configured to link each center $C_X$, $C_Y$ to the closest center $C_X$, $C_Y$ of same orientation, in order to link the centers $C_X$, $C_Y$ associated with a same strand $T_X$, $T_Y$ so as to obtain the skeleton $Sq_X$, $Sq_Y$ of the strands $T_X$, $T_Y$ of the vane 1.

According to one aspect, the calculation member 2 is configured to determine the reference volumes $R_X$, $R_{X'}$, $R_{X''}$, $R_Y$ by tomographic simulation.

According to another aspect, the calculation member 2 is configured to filter the tomographic volume V for example by a Gabor filter G.

According to another aspect, in the case of a plurality of reference volumes $R_X$, $R_{X'}$, $R_{X''}$, $R_Y$, the calculation member 2 is configured to select the maximum correlation score associated with each voxel of the tomographic volume V.

It goes without saying that the skeletonization system could comprise a plurality of calculation members 2 each configured to carry out a part of the tasks listed above, and a plurality of databases 3, integrated or not in a calculation member 2.

The invention claimed is:

1. A method for skeletonizing strands of a composite material part in a 3D image of said part, said image comprising a plurality of voxels extending in an orthogonal coordinates system and each comprising a gray level, said method comprising:
    a phase of detecting a plurality of oriented section centers of the strands of the part in said image, and
    a phase of linking each center to the closest center of same orientation, in order to link the centers associated with a same strand, so as to obtain a skeleton of the strands of said part,
    wherein the detection phase is implemented by means of at least one reference volume comprising a plurality of voxels, said voxels extending in the orthogonal coordinates system and each comprising a gray level in such a way that the at least one reference volume comprises a centered strand pattern extending along a given direction, said detection phase comprising, for each reference volume;
    a step of determining portions of said image comprising a central voxel and of dimension equal to that of said reference volume;
    a step of calculating a correlation score between said reference volume and each portion of said image by comparison of the gray level of their respective voxels, said correlation score being associated with the central voxel of each portion so as to obtain a correlation score for each voxel of said image forming a matrix of correlation scores, and
    a step of determining oriented section centers of the strands of the part, said centers corresponding to the voxels of said image of which the correlation score corresponds to a local maximum of the matrix of correlation scores, the orientation of said centers being defined by the direction of the strand pattern of said reference volume.

2. The method for skeletonizing, according to claim 1, the strands of a composite material part comprising a density of strands greater than 50%.

3. The skeletonization method according to claim 1, wherein the detection phase is implemented by means a plurality of reference volumes, the strand patterns of said reference volumes, extending along different given directions.

4. The skeletonization method according to claim 1, wherein the detection phase is implemented by means of a plurality of reference volumes, the strand patterns of said reference volumes, comprising different sections.

5. The skeletonization method according to claim 1, wherein at least one reference volume comprises around the strand pattern a neighborhood comprising at least one neighboring strand pattern.

6. The skeletonization method according to claim 5, wherein the detection phase is implemented by means of a plurality of reference volumes, the strand patterns of said reference volumes comprising different neighborhoods.

7. The skeletonization method according to claim 1, wherein when the detection phase is implemented by means of a plurality of reference volumes, the method comprises a step of selecting the maximum correlation score associated with each voxel of said 3D image of the part.

8. The skeletonization method according to claim 1, comprising a preliminary step of determining at least one reference volume by selecting a portion or an average of portions of said image comprising a central voxel and comprising a centered strand pattern extending along a given direction.

9. The skeletonization method according to claim 1, wherein the linking phase comprises:
    a step of calculating, for each oriented section center, a distance separating it from the closest center of same orientation, and
    when the distance is less than a maximum distance, a step of plotting a curve linking each center to the closest center of same orientation.

10. A skeletonization system for the implementation of the method for skeletonizing strands of a composite material part in a 3D image of said part according to claim 1, said skeletonization system comprising at least one database comprising at least one reference volume comprising a centered strand pattern extending along a given direction, said skeletonization system comprising at least one calculation member which, for each reference volume, is configured to:
    determine portions of said image of dimension equal to that of said reference volume,
    calculate a correlation score between said reference volume and each portion of said image by comparison of the gray level of their respective voxels, said correlation score being associated with the central voxel of each portion, so as to obtain a correlation score for each voxel of said image forming a matrix of correlation scores, and
    determine the oriented section centers of the strands of the part, said centers corresponding to the central voxels of the portions of which the correlation score corresponds to a local maximum of the matrix of correlation scores, the orientation of said centers being defined by the direction of the strand pattern of said reference volume,
    said calculation member being in addition configured to link each center to the closest center of same orientation, in order to link the centers associated with a same strand so as to obtain a skeleton of the strands of the part.

* * * * *